United States Patent [19]

Geil

[11] 3,867,715

[45] Feb. 18, 1975

[54] UNDERWATER COMMUNICATIONS SYSTEM

[75] Inventor: Fred G. Geil, Pittsburgh, Pa.

[73] Assignee: The United States of America as represented by the Secretary of the Navy, Washington, D.C.

[22] Filed: Nov. 8, 1973

[21] Appl. No.: 414,012

[52] U.S. Cl. ................ 340/5 T, 179/1 UW, 325/28

[51] Int. Cl. ......................... H04b 1/62, H04b 11/00

[58] Field of Search .......... 340/5 R, 5 T; 179/1.5 C, 179/1.5 FS, 1 UW; 325/28

[56] References Cited

UNITED STATES PATENTS 3,225,142 12/1965 Schroeder ........................ 179/1.5 C 3,230,500 1/1966 Dunn .................................. 340/5 T

*Primary Examiner*—Richard A. Farley

*Attorney, Agent, or Firm*—Richard S. Sciascia; Ervin F. Johnston; William T. Skeer

[57] ABSTRACT

The communication method and system for use in reverberant environments includes a transmission of the real time communication message followed by a transmission of the same message recorded and processed to occupy a longer period of time and to have an inverted time sequence order.

10 Claims, 5 Drawing Figures

| OPERATING PROCEDURES | STATION 11 | STATION 12 |
|---|---|---|
| 1. TRANSMISSION OF MESSAGE | NORMAL TRANSMISSION WITH AUTOMATIC SHORT TONE AT BEGINNING; MESSAGE RECORDED.<br>*OPERATOR FUNCTIONS:* NORMAL FUNCTIONS PLUS LOADING OF TAPE CASSETTE. | MESSAGE RECEIVED; IF UNDERSTOOD, REVERSE TIME-STRETCHING NOT USED.<br>*OPERATOR FUNCTIONS:* NORMAL FUNCTIONS PLUS LOADING OF TAPE CASSETTE. |
| 2. REQUEST FOR REPEAT | | IF MESSAGE NOT UNDERSTOOD, FIVE-SECOND TONE TRANSMITTED AS SIGNAL TO REPEAT WITH REVERSE TIME-STRETCHING.<br>*OPERATOR FUNCTION:* HOLD RED SWITCH 37' UP. |
| 3. REVERSE TIME-STRETCHING PROCESSING | RECORDED MESSAGE PLAYED AT SLOWED RATE AND BACKWARD INTO TRANSMITTER.<br>*OPERATOR FUNCTION:* HOLD GREEN SWITCH 36 UP. | MESSAGE RECEIVED AND AUTOMATICALLY RECORDED AT SLOWED RATE AND BACKWARD.<br>*OPERATOR FUNCTION:* CONTINUE TO HOLD RED SWITCH 37' UP. |
| 4. RECONSTRUCTION | TONE INDICATES TAPE HAS PLAYED THROUGH TO START OF MESSAGE: RECORDER RESET AND TAPE PLAYED FORWARD AT NORMAL SPEED (WITHOUT TRANSMISSION).<br>*OPERATOR FUNCTION:* HOLD GREEN SWITCH 36 DOWN. | TONE INDICATES TAPE HAS PLAYED THROUGH TO START OF MESSAGE; RECORDER RESET AND TAPE PLAYED FORWARD AT NORMAL SPEED.<br>*OPERATOR FUNCTION:* HOLD RED SWITCH 37' DOWN. |

FIG. 4

UNDERWATER COMMUNICATIONS SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of communications. More particularly, the invention pertains to the field of acoustic or compressional wave communication. By way of further illustration, the invention pertains to compressional wave communication techniques for use in reverberant surroundings. In still greater particularity, the invention pertains to compressional wave communication between two spatially separated points in a reverberant surrounding. By way of further characterization, but not by way of limitation thereto, the invention will be described as it pertains to acoustic communications in underwater reverberant surroundings.

DESCRIPTION OF THE PRIOR ART

The communications of voice signals by underwater compressional wave communication systems is a well understood and extensively developed field of communication arts. For example, the U.S. Pat. Nos. 3,164,800 to J. T. Kroenert; 3,267,414 to J. Kritz; 3,277,429 to J. H. Hammond, Jr.; and 3,337,841 to W. N. Wainwright et al. are examples of known prior art systems suitable for these applications. In general, these systems are well understood acoustic analogs of the radio frequency type communication systems.

As in the case with the radio frequency transmitter counterparts, the acoustic transmission systems depend, for their effective utilization, on environmental conditions favoring their use. The acoustic counterpart to the magnetic storms and ionospheric disturbances which affect radio frequency communications are surface noise and marine mammal generated ambient noise. Various efforts to minimize disturbances caused by these acoustic phenomena have met with varying degrees of success. For example, that discussed in U.S. Pat. No. 3,218,607 issued on Nov. 16, 1965 to C. R. Brock et al. for "Underwater Telephone" is exemplary of the techniques he used to minimize such noise.

In addition to noise created by marine mammals, sea states, and thermal generated noise an environmental type condition affecting compressional wave generation is the phenomena of reverberation caused by a multipath reflection of the acoustic energy between communication points. Although this type of environmental disturbance has plagued underwater communication efforts for many years, the problem has heretofore remained an endured handicap to successful communications in many locations.

The foregoing discussion is not intended as an exhaustive analysis of the prior art, but merely an indication of prior art constructions having a recognizable similarity in the purpose to this invention. The design of underwater communications equipment remains a somewhat empirical art and a great many ostensibly promising constructions have been proposed, enthusiastically evaluated, expectantly tried, and quickly abandoned. Many of these systems designs require complex and interrelated combinations of mechanical and electronic components resulting in systems which are bulky, complicated, and difficult to operate in the arduous conditions found in the underwater environment.

SUMMARY OF THE INVENTION

This invention employs a method of underwater communications and a system therefor in which the desired communication is transmitted between the spaced underwater points in real time and, selectively, transmitted between the same two points in extended or stretched time and in an inverted time sequence. The interconnection of the various state-of-the-art components comprising the system and the practice of the invention will become more clear with reference to the following descriptive material taken together with the illustrations.

STATEMENT OF THE OBJECTS OF THE INVENTION

Accordingly, it is an object of this invention to provide an improved communication system and method.

A further object of this invention is to provide an improved communication system and technique for use in reverberant environments.

Yet another object of this invention is to provide an improved communication system for underwater environments.

A still further object of this invention is provision of a communication system which transmits messages in both real time and extended time.

Still another object of the present invention is to provide an underwater communication system employing both real time communication and stretched time communication.

Yet another object of the present invention is to provide an underwater communication system and method employing an inverted time sequence transmission.

Still a further object of this invention is to provide an underwater communication process and system employing both real time normal communications and, selectively, inverted order stretched time communications.

These and other objects of the invention will become more readily apparent from the ensuing specification when taken with the drawings.

BRIEF DESCRIPTION OF THE DRAWINGS

FIG. 4 is an operational flow diagram showing the steps utilized in the transmission of messages according to the invention.

DESCRIPTION OF THE PREFERRED EMBODIMENTS

Figure 1:
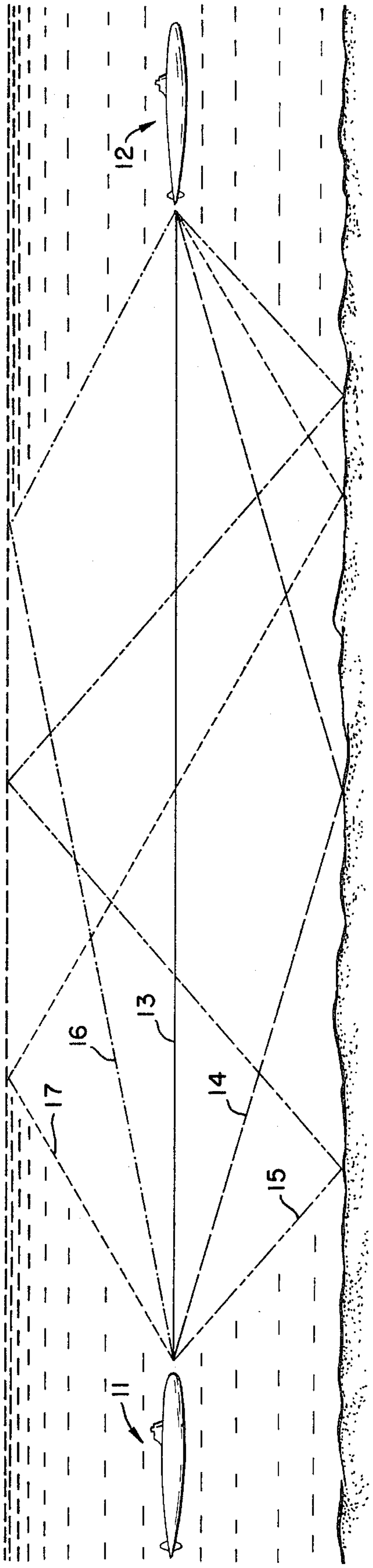
FIG. 1 is a side elevation view showing the environment in which the invention is practiced.

Referring to FIG. 1, a sectional view through an ocean or other body of water is shown. Within this underwater environment, an underwater vessel 11 and an underwater vessel 12 are illustrated in a spaced relationship. Of course, the underwater vessels 11 and 12 are merely representative of two spaced stations within the underwater environment between which communications are desired to be established. For example, station 11 could be an underwater habitat as well as an undersea vessel while station 12 could be a swimmer/-diver working in the ocean environment from the habitat. Additionally, shore installations may comprise one or both of the stations.

The communications paths between the two underwater stations include a direct path, indicated by a solid line 13. Were path 13 the only communication path over which the transmitted acoustic message would be conveyed, no underwater communications problem other than the aforediscussed ambient noise would be present. In most circumstances, a variety of other paths are available. For example, path 14, illustrated by a broken line, shows a single bottom reflection occurring between underwater stations 11 and 12. The strength and delay of such underwater reflection paths depends upon the material, smoothness, and depth of the bottom.

Similarly, multiple path reflections may originate from point 11, be reflected first from the bottom and then from the surface before reaching the receiving station at point 12. Such a transmission path is indicated by broken line 15.

Similar to the single bottom reflection path a corresponding surface reflection path may also exist as indicated by line 16. The strength and time delay of such a path would depend upon the sea state, the depth of transmission station 11, the depth of transmission station 12, and their separation. Of course, multistage reflections could also be obtained by reflections from the sea surface to the sea bottom before reaching reception point 12. Such a path is illustrated by line 17.

The foregoing description assumes that the transmission of acoustic energy commenced at station 11 and traveled to station 12. Of course, the reverse might also be possible. That is, transmissions commencing at station 12 to be received at station 11 could traverse the same paths as illustrated.

Figure 2:
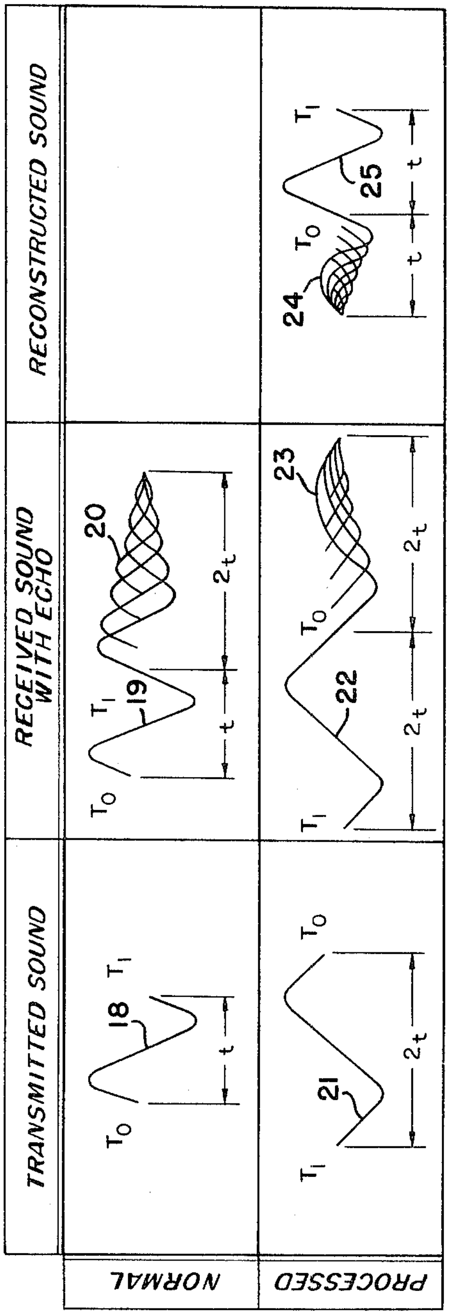
FIG. 2 is a diagrammatic representation of acoustic sound waves transmitted in the environment illustrated in FIG. 1 by the invention.

The affect of reverbation on a signal transmitted in the above described fashion may be seen with reference to FIG. 2. As shown, the normal transmitted sound is represented by one cycle of a sine wave 18. The duration of the cycle is indicated by $t$ and the time of commencement of transmission by $T_0$ and the termination of the single cycle by $T_1$. The received sound with the reverberant echo is shown in the second frame of the upper row of figures in which the received sound wave 19 occupies the same time period, $t$, commencing at $T_0$ and terminating at $T_1$. However, it will be noted that additional spurious signals are received due to the plurality of transmission paths and are illustrated generally at 20 as a series of damped, overlapping sinusoidal waves. For practical purposes, in most environments where communication is possible, such a reverberation decays in a period of $2_t$ in comparison with the duration of the initial sine wave.

The result of the reverberant echo being present with the signal is such that the initial syllable of a spoken word or initial tongue-teeth sound produced by the speaker is transmitted relatively undistorted while the vowel sounds and other consonant shapings which give the sound pattern its recognizable word characteristic are largely obliterated by the damped reverberant echos, illustrated at 20, which tend to intermingle and override subsequent portions of the spoken voice.

It has been noted that due to psychological and perhaps physiological conditioning, the placement of the reverberant echo at the ending of a syllable sound is more deleterious than if the echo were placed at the beginning of the syllable sound.

Also, it will be noted that the extension of the original period, $t$, to a period three times as long to include the damped echo is a result of the length of time of multipath reflections and the attenuation of the medium rather than any inherent acoustic phenomena. That is, the extent and magnitude of the damped acoustic signal may be somewhat greater or less than that illustrated but such a length is useful in explanation. If the length and decay rate were longer, useful communication for all practical purposes becomes impossible. For reverberations which decay much more rapidly than that illustrated the initial communication is so relatively undisturbed that its intelligibility is not as seriously affected.

Considering now, the second row of illustrated wave forms in FIG. 2, it will be seen that the invention utilizes a replayed and time stretched signal indicated by sine wave 21 which commences at $T_1$ and terminates at $T_0$. Such a signal is said to be in inverse time order. That is, the last portion of the originally produced sound is transmitted first and the first, last.

It will be also noted that the sine wave 21 occupies a period of $2t$. This increased time duration of the signal is referred to as time stretching since the processed signal requires twice the length of time for transmission as the initial sound indicated by sine wave 18. The received time stretched signal with echo is illustrated in the center panel. It will be seen that the received sine wave 22 is followed by a damped sinusoidal wave echo, indicated generally at 23, which still occupies the time duration $2t$. However, because the initial time stretching caused the transmitted sine wave to occupy a period $2t$ the relative time of reverberant echo has been reduced by a factor of 2. By recording the received sound with echo in the processed mode and reconstructing by replaying in a reversed direction at an altered speed it may be seen that the echo 24 has been reduced to a period of t the same as the desired sound wave transmission sine wave 25 and, instead of following this transmission, now proceeds it.

The effect of placing this damped echo reverberation component at the forward part of the syllable rather than in the rear part of this signal has been to markedly increase the intelligibility of the signal.

It should be noted that other forms of reverberent distortions may also occur. That is, in some instances the reverberent echo is delayed. In such cases, the reversing technique is best. In other instances the reverberent echo is instantaneous and arrives at the same time as the principal sound transmission. In those cases, forward time stretching will provide a marked improvement. However, such acoustic conditions are governed by the particular water, bottom, and temperature conditions. The invention will be described as it relates to the aforedescribed conditions where reverse time stretching is employed.

Figure 3:
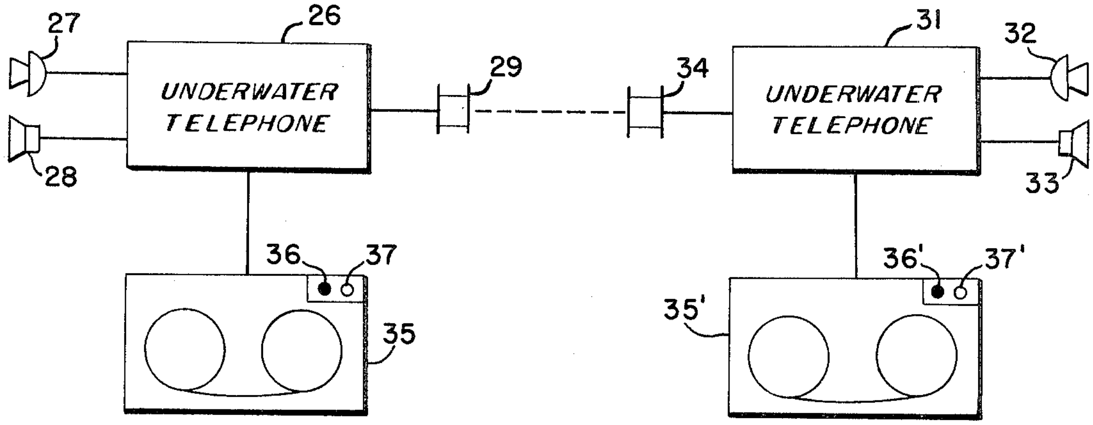
FIG. 3 is a block diagrammatic showing of a simplified system used in the practice of the invention.

FIG. 3, a simplified system for obtaining the improved results of the invention described in connection with FIG. 2 is shown. An underwater telephone 26 receives a voice communication signal from a microphone 27. Underwater telephone 26 is a state-of-the-art device for the transmission of acoustic energy between spaced points underwater and may be any of the systems shown in the aforereferenced patents. Because of the wide spread use of such systems by the military, these devices are frequently referred to by their military designators, WQC or UQC Equipment. Thus, underwater telephone 26 is comprised basically by a UQC transmitter and UQC receiver. The underwater telephone 26 is connected to an electroacoustic transducer 29.

At the receiving point, a similar telephone 31 is electrically connected to an electroacoustic transducer 34 which, as indicated by the broken lines, is connected to electroacoustic transducer 29 by means of a communications path. Here, the term communications path generally encompasses any interconnecting channel for communication of compressional wave energy between the two electroacoustical transducers. In the arrangement illustrated in FIG. 1 the communication path would, therefore, be comprised by the paths 13, 14, 15, 16, and 17 as previously explained.

Underwater telephone 31 is connected to a suitable utilization device to be driven by the transmitted signals over the communication path. In the illustrated arrangement, the utilization device might be considered speaker 33. Of course, other utilization devices including speech and spectrum analyzers may be employed if desired.

Normally, each underwater telephone 26 and 31 is a two direction arrangement capable of both originating and receiving voice communications. For this reason, underwater telephone 26 also has a utilization device 28 connected thereto and, similarly, underwater telephone 31 is fed by a microphone 32.

Although microphones 27 and 32 are illustrated as representative of inputs for underwater telephones 26 and 31 it will be readily understood that by those conversant in the communication arts other composite signals may be used. Thus, when used therein the term voice communications refers to any real time frequency message which is desired to be transmitted between stations 11 and 12.

As shown, underwater telephone 26 has a tape recorder 35 connected thereto. The term "tape recorder" as used in this description, includes both recording and playback capabilities as the term is commonly understood in the commercial world. Tape recorder 35 may be either the reel-to-reel or cassette type.

Tape recorder 35 is capable of tape transport at a normal speed, i.e., 4.5 cm/sec, and a reduced speed, i.e., 2.25 cm/sec, in both a forward direction and a reverse direction. In practice, a transport having this capability may be manufactured or a conventional state-of-the-art tape recorder may be modified to provide this capability by using conventional motor speed control circuitry. In models using synchronous drive motors this modification is particularly straightforward. In models using a single non-synchronous motor for a drive the fast-forward and rewind may be used as the normal speed with modifications of the recorder to leave the tape in operative contact with the tape head at some sacrifice in speed and flutter distortions. By way of illustration, it should be noted that commercially available units such as that manufactured by the Uher Corporation and sold under the name "Model 124," as well as others, have proven satisfactory in developmental models.

The tape transport controls of the tape recorder have been modifed to be operated by two switches indicated at 36 and 37. Switch 36 is used in the transmission of messages and for purposes of instructive clearness for operational personnel, is colored green and referred to as the "green switch." Switch 37 is used in the reception of messages and is given the characteristic color red and so referred to in instructional manuals. Each switch 36 and 37 has a neutral central position in which the tape transport mechanism is de-energized and an up position in which the tape transport is operated at a slowed speed and a down position at which the tape transport mechanism is operated at the normal speed. The transport mechanism is wired such that when switch 36 is in the "up" position the tape transport mechanism is moved in a reverse direction and when in a down position it is moved in the normal direction.

Of course, underwater telephone 31 is supplied with a similar tape recorder 35' with similar control capabilities indicated at 36' and 37'.

Manner in which the method of the invention is practiced will be made clear by reference to the following method of operation.

METHOD OF OPERATION

The operation of the communications system of the invention proceeds in a manner to now be described. It will be assumed, for purposes of illustration, that the message is being transmitted from station 11 to station 12 as shown in FIG. 1. The communication technique commences with the normal transmission of the voice communication preceded by a short tone indicating that a voice communication message is to follow. The operator at station 11 uses the underwater telephone 26 in the normal fashion having first loaded a recording tape on the tape recorder 35. Of course, the normal transmitted message is recorded on recorder 35, in the conventional and well understood fashion.

The operator at station 12 is alerted to the fact that a voice communication message is being transmitted by the operation of the short tone signal on a conventional communication circuitry known as an "auto-call" or "auto-alarm." The message is received by underwater telephone 31 having been transmitted between transducers 29 and 34 along the composite communications path.

The operator functions at the receiving station 12 are normal functions of using underwater telephone 31 in the receive mode plus the additional step of loading a recording tape on recorder 35'.

If the transmission of the message is understood, that is, not seriously affected by underwater reverberations, no additional operator functions are required and the communication between the two stations proceeds in the well understood prior art fashion. However, as is often the case, if the message is not understood at receiving station 12 because of the high reverberation content, the operator transmits a specially coded tone signal to be received at station 11. For purposes of illustration, this tone signal may be the same tone signal as is used to receive messages such as to trip the "auto-call" circuitry, except of a longer time duration. In practice, a two second signal is used for the auto-call trip signal and a five second tone signal is used for the indication that reverberation was present on the signal.

The transmission of the tone message may be interconnected with the transport control mechanism and energized when the operator holds red switch 37' in the "up" position.

When the operator at a station 11 receives the five second tone signal indicating that reverberation was present on the communication, he retransmits the message at the slowed rate and at an inverse time order from that which the original message was transmitted.

This transmission is accomplished in the system shown in FIG. 3 by pulling green switch 36 in the upward position. In this position, the tape transport is caused to replay the previously recorded voice communication at a slowed rate and in an inverse order by winding the tape past the tape head in a reverse direction to that at which it was recorded and at a speed one-half that at which it was recorded.

The reversed and time stretched message is received at station 12 by the hydrophone 34 and is recorded at a slowed rate and backward to the normal direction as a consequence of operator holding red switch 37' in the upward position.

This slowed and time stretched communication is continued until the auto-call trip signal is reached on the tape on tape recorder 35 at which time transmission is stopped.

The operator function to stop this transmission is the normal operating function connected with the specific underwater telephone 26 being used and the release of green switch 36.

The operator at station 12 reconstructs the message and responds to the function of the auto-call trip signal by holding red switch 37' in the "down" position which causes tape recorder 35' to switch to the playback mode and transport the tape past the record head in the normal, or forward, direction, at the normal speed.

The signal thus reconstituted may be compared with the originally received signal and words which were made particularly indistinguishable by reverberation destroying the last part of the word now become much more intelligible as the reverberation occurs at the first part of the word and for a shorter time duration than with the original transmission. Thus, in a voice communication the signal is utilized by listening to it over the speaker. In other type communications the signals may be fed to other utilization devices such as teletype printers, for example.

Figure 5:
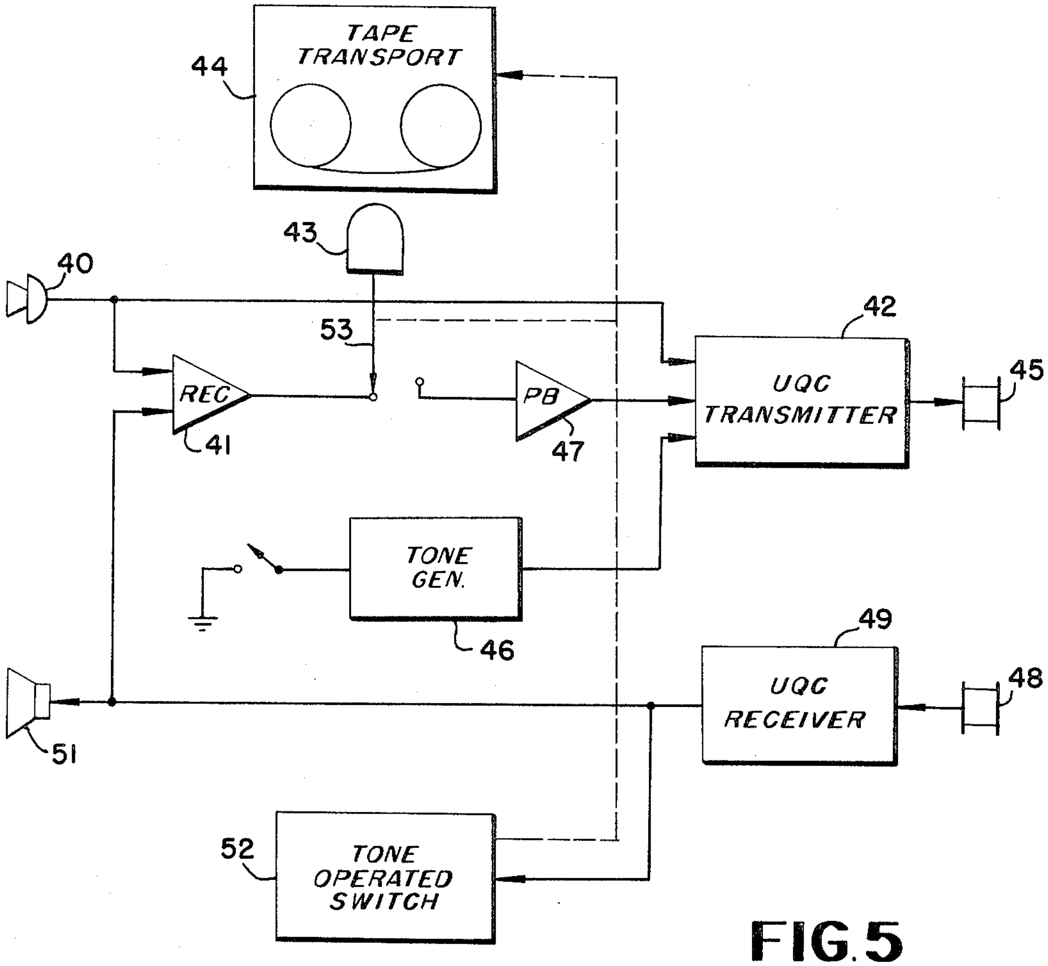
FIG. 5 is a block diagram of a communication system according to the invention in which some of the steps illustrated in FIG. 4 are performed by the components comprising the system rather than operator manipulation.

Referring to FIG. 5, the diagrammatic representation of the modified underwater telephone is shown which automatically performs some of the operational steps previously described. In the improved system the real-time voice communication is received by a microphone 40 that is connected to a recording preamplifier 41 and fed also into a UQC transmitter 42 for transmission. A tape recording head 43 is connected to recorder preamplifier 41 and is operatively positioned and operatively associated with a two speed reversible tape transport 44.

UQC transmitter 42 is connected to an electro-acoustic transducer 45 in order to convert the electrical voice signals to an acoustic transmission. A tone generator 46 is also connected to the UQC transmitter for generation of the "auto-call" signals and the repeat message signals previously described. UQC transmitter 42 also receives a signal from the tape head 43, via a playback preamplifier 47, during retransmission of the voice communications. Received messages are intercepted by a hydrophone 48 which is connected to a UQC receiver 49. The UQC receiver, in turn, is connected to a tone operated switch 52 to serve as a switching function when a repeat of the recorded message is desired.

Also, a utilization device, such as speaker 51, is connected to a receiver 49 to utilize the communication signals in the normal fashion. UQC receiver 49 is also connected to recording preamplifier 41 such that incoming messages may be recorded for reconstruction as previously described.

Of course, an identical unit is employed at the other voice communication station to cooperate with the device to provide two-way communications.

It may be readily seen that this arrangement permits the operator at the receiving station, either station 11 or station 12, in two-way communication exchanges to initiate the time stretch and slowed transmission from the other station.

The foregoing description when taken together with the appended claims constitute a disclosure such as to enable a person skilled in the electro-acoustic and communication arts and having the benefit of the teachings contained therein to make and use the invention. Further, the structure and method herein described meets the aforestated objects of invention and generally constitutes a meritorious advance in the art which is unobvious to such a skilled artisan not having the benefit of these teachings.

Obviously, many modifications and variations of the present invention are possible in the light of the above teachings and it is therefore understood that within the scope of the disclosed inventive concept, the invention may be practiced otherwise than specifically described.

What is claimed is:

1. A method of voice communication in a reverberant environment comprising the steps of:

transmitting the voice communication over a normal communication path from a first station to a second station spaced therefrom in said reverberant environment where it is received;

simultaneously recording at a first rate the voice communication during the transmitting step at the first station;

replaying the recorded voice communication in reverse time sequence and at a slower rate than that at which it was recorded;

transmitting the replayed voice communication over the normal communication path between said first and said second stations;

rerecording said replayed voice communication at said slower rate of speed at said second station as it is received over said communication path;

replaying said rerecorded voice communication at the said first rate and in reverse time sequence than that at which it was rerecorded at said second station; and utilizing said received voice communications to extract information therefrom.

2. A method of voice communication according to claim 1 further including the step of transmitting a tone prior to the transmission of the voice communication.

3. A method of voice communication according to claim 1 in which the first rate is at least twice as fast as said slower rate.

4. A method of voice communication according to claim 2 in which the first rate is at least twice as fast as said slower rate.

5. A communication system for use in reverberant environments comprising:

a voice communication transmitter having two inputs;

a real-time voice communication signal source connected to one input of said voice communication transmitter;

a first reversible, two-speed recorder means connected to the other input of said voice communication transmitter for selectively recording the real-time voice communication from said real-time voice communication signal source at the faster of the two speeds and to selectively replay the recorded real-time voice communication at the slower of the two speeds and in the reverse time sequence as an input for said voice communication transmitter;

a voice communication receiver effectively connected to said voice communication transmitter by a communication path for receiving voice communications transmitted over said communication path;

a second reversible, two-speed recorder connected to said receiver to selectively record voice communications received by said receiver at the slower one of the two speeds and to selectively play back the recorded voice communication at the faster of said two speeds and in reverse time sequence; and a utilization device effectively connected to said vocie communication receiver and to said second reversible, two-speed recorder to utilize the voice communications transmitted over said communication path and replayed by said second reversible, two-speed recorder.

6. A voice communication system according to claim 5 wherein said voice communication transmitter is a compressional wave, underwater transmitter.

7. A voice communication system according to claim 5 in which said real-time voice communication signal source is a microphone.

8. A voice communication system according to claim 5 in which said voice communication transmitter includes a tone generating means to permit transmission of predetermined duration tone signals.

9. A voice communication system according to claim 8 in which said voice communication receiver includes a tone operated switch which is responsive to the tone signals transmitted by said voice communication transmitter.

10. A voice communication system according to claim 9 in which said tone operated switch is effectively connected to said tape transport to effect speed control thereof.

* * * * *